United States Patent
Breer et al.

(10) Patent No.: US 10,688,965 B2
(45) Date of Patent: Jun. 23, 2020

(54) APPARATUS FOR DETERMINING THE POSITION OF A MOBILE ACCESS DEVICE ON THE VEHICLE

(71) Applicant: HUF HÜLSBECK & FÜRST GMBH & CO. KG, Velbert (DE)

(72) Inventors: Jan Breer, Essen (DE); Stefan Neuhoff, Essen (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 0 days.

(21) Appl. No.: 16/337,334

(22) PCT Filed: Jul. 20, 2017

(86) PCT No.: PCT/EP2017/068395
§ 371 (c)(1),
(2) Date: Mar. 27, 2019

(87) PCT Pub. No.: WO2018/059781
PCT Pub. Date: Apr. 5, 2018

(65) Prior Publication Data
US 2020/0031315 A1    Jan. 30, 2020

(30) Foreign Application Priority Data

Sep. 30, 2016 (DE) .......... 10 2016 118 641

(51) Int. Cl.
*B60R 25/24* (2013.01)
*H04W 4/02* (2018.01)

(52) U.S. Cl.
CPC .......... *B60R 25/24* (2013.01); *H04W 4/023* (2013.01); *B60R 2325/101* (2013.01); *B60R 2325/205* (2013.01)

(58) Field of Classification Search
CPC .............. B60R 25/24; B60R 2325/101; B60R 2325/205; H04W 4/023
See application file for complete search history.

(56) References Cited

U.S. PATENT DOCUMENTS

| | | | |
|---|---|---|---|
| 2010/0201483 A1* | 8/2010 | Nakajima | G07C 9/00309 340/5.61 |
| 2011/0309922 A1* | 12/2011 | Ghabra | B60R 25/24 340/426.36 |

(Continued)

FOREIGN PATENT DOCUMENTS

| | | |
|---|---|---|
| DE | 10 2013 221 936 A1 | 5/2014 |
| DE | 10 2014 102 328 A1 | 8/2014 |

(Continued)

OTHER PUBLICATIONS

International Search Report of International Application No. PCT/EP2017/068395 dated Nov. 6, 2017, 6 pages.

(Continued)

*Primary Examiner* — Thomas D Alunkal
(74) *Attorney, Agent, or Firm* — Fay Sharpe LLP

(57) ABSTRACT

Apparatus for determining the position of a mobile access device relative to a motor vehicle includes a control device in the vehicle which disables and enables access to a vehicle function. A plurality of separate modules each include a housing, a communication device for wireless short-range communication and an energy store. The modules have a mounting attachment in the interior of a vehicle and at least one of the modules is coupled to the control device for the purpose of data transmission. The modules each detect a signal strength of a signal transmission between the access device and the respective module and are configured with the control device to carry out position determination for the access device on the basis of multiple detected signal (Continued)

strengths of different modules and to enable or disable access to the vehicle function on the basis of the determined position.

20 Claims, 2 Drawing Sheets

(56) References Cited

U.S. PATENT DOCUMENTS

| | | | | |
|---|---|---|---|---|
| 2014/0187219 A1* | 7/2014 | Yang | ............... | H04M 1/72577 |
| | | | | 455/418 |
| 2014/0191911 A1* | 7/2014 | Merrick | ............... | H01Q 1/3283 |
| | | | | 343/712 |
| 2014/0195125 A1* | 7/2014 | Siegel | ............... | B60H 1/00742 |
| | | | | 701/49 |
| 2016/0042579 A1* | 2/2016 | Austen | ............... | B60R 25/209 |
| | | | | 340/5.61 |
| 2016/0320469 A1* | 11/2016 | Laifenfeld | ............ | G01S 5/0284 |
| 2017/0361792 A1* | 12/2017 | Lem | ............... | E05B 77/54 |
| 2018/0018179 A1* | 1/2018 | Scheufler | ............ | H04W 12/0605 |

FOREIGN PATENT DOCUMENTS

| | | |
|---|---|---|
| EP | 0 491 095 A1 | 6/1992 |
| EP | 1 193 131 A1 | 4/2002 |
| WO | WO 2014/159873 A1 | 10/2014 |
| WO | WO 2016/110676 A1 | 7/2016 |

OTHER PUBLICATIONS

International Preliminary Report on Patentability of International Application No. PCT/EP2017/068395 dated Apr. 2, 2019, 13 pages.

\* cited by examiner

APPARATUS FOR DETERMINING THE POSITION OF A MOBILE ACCESS DEVICE ON THE VEHICLE

BACKGROUND

The present invention refers to an apparatus for determining the position of a mobile access device relative to a motor vehicle.

On vehicles, electronic access means are frequently used for triggering a closing function or a starting function on the vehicle. To this end, remote radio-controls for vehicles are known and also so-called keyless entry systems and keyless go systems, which render an active operation of the remote control means superfluous.

Increasingly, also multifunctional devices with wireless communication capabilities are used for authorization verification with respect to a motor vehicle. The access device in this case is a mobile communication device such as a mobile phone or a mobile computer, which takes over the functions of a vehicle key, so that the user does not have to carry further access devices beyond its mobile communication device. The access device is provided with corresponding data and interfaces, which allow a communication with vehicle systems, in order to transmit authorization data to the vehicle.

These mobile access devices are however not compatible with established systems for the access verification of motor vehicles. Conventional systems on motor vehicles frequently use low-frequency signals, in particular in order to determine the position of an access device relative to the vehicle and to include this position in a plausibility verification.

However, modern mobile phones, smartphones and portable computers are provided with standardized interfaces for high-frequency communication, which are incompatible with these systems for position determination on the vehicle side.

The object of the invention is to offer a simple and retrofittable solution for vehicles, which allows a reliable position determination of a mobile access device relative to a vehicle, in order to provide more secure access authorizations on the vehicle.

BRIEF SUMMARY

This object is achieved by an apparatus having the features of claim 1.

According to the invention, an apparatus for determining the position of a mobile access device relative to a vehicle is proposed, wherein the mobile access device has a communication device for wireless short-range communication.

The mobile access device may be a commercially available communication device, such as a mobile phone or a portable computer. These systems normally contain one or more communication devices for establishing wireless short-range communications. A short-range communication in the context of the present application is a radio technology, which allows a spatially delimited data exchange within a few meters, such as up to 20 meters.

The vehicle is provided with a control device, which is configured for disabling and enabling access to a vehicle function. The function may be the enabling or disabling of door openings or hatch openings, while also the starting of the motor of the vehicle or another operating function, which may be triggered from within the vehicle passenger compartment, may be contemplated.

According to the invention, a plurality of separate modules is provided, which are provided within a respective housing. Each module contains in its corresponding housing a communication device for said wireless short-range communication. Moreover, each of the modules is provided with a separate autonomous energy store, such as a battery. The housings of each module thus comprise both the communication device for wireless short-range communication and the corresponding energy store.

Each of the modules also has mounting means, which allow the attachment of the modules in the interior of a vehicle. To this end, the housings may have detent means, in order to place the housings of the modules in suitable stationary positions within the interior of the motor vehicle, wherein the detent means interact with counter-elements on the vehicle side. Alternatively, other mounting means may be provided, such as adhesives or magnets.

At least one of the modules is coupled to the control device for the purpose of data transmission. A data link may be established between the at least one module and the control device of the motor vehicle, through which a data transfer from said module to the control device is possible. The other modules may also be directly coupled to the control device, in order to transmit data thereto, but it may also be envisaged, that the modules are in communication with each other and that only said module is coupled to the control device. The coupling may occur through the communication device for short-range communication, which is formed within the module or through another coupling means.

The modules are configured for detecting a respective signal strength of a signal transmission between the access device and the respective module. Moreover, the modules and the control device of the vehicle are configured to carry out a position determination for the access device on the basis of multiple detected signal strengths of different modules. The access to the vehicle function is enabled or disabled on the basis of said signal strength determination.

The modules are positioned according to the invention at different positions in the motor vehicle, in particular in the passenger compartment of the motor vehicle. Depending on the position and arrangement of the access device, a data exchange occurs between the communication device and a module with a signal strength, which depends on the distance and the obstacles present along the radio link. By calibrating the system, signal strength profiles of the plurality of modules are evaluated in the control device or even in one of the modules, in order to determine the position of the access device within the passenger compartment or also on the outside of the passenger compartment.

The mobile access device establishes a signal exchange through the short-range communication with several of the modules. In several of these modules, the corresponding communication signal strength is determined. By comparing the signal strengths, the position of the mobile access device may be approximately determined. The determination of the position and of the distance through high-frequency radio technology is fundamentally more difficult than the use of low-frequency radio waves for position determination; however, the flexible arrangement of the modules of the inventive system within the vehicle interior allows a reliable recognition, in particular of the internal or external position of the access device.

The flexible arrangement of each module, which is provided with its own energy store and mounting means, allows an optimal positioning of the modules within the vehicle and a retrofitting of corresponding vehicles. The modules do not have wired interconnection means among each other, but are independently powered and may be positioned at arbitrary positions within the vehicle. The corresponding systems with the modules may thus be deployed very rapidly and with reduced costs. This is very advantageous with respect to wired systems, since no cables have to be laid inside the vehicle and positioned behind the panels.

In a preferred embodiment of the invention, the modules with their communication devices and the access devices with their communication device are configured according to a Bluetooth Low Energy (BLE) standard. The BLE standard is part of a well-established Bluetooth specification. Fundamentally there are communication devices which only support the BLE standard, while other devices support the BLE standard as well as the conventional Bluetooth standard.

Due to energy efficiency considerations, the modules according to the preferred embodiment exclusively support the BLE standard, in order to ensure a durable and long-term operation of the system with the autonomous satellites having their own energy supply over a period of several years.

According to a preferred embodiment of the invention, the modules of the inventive system are configured in such a way that each of the modules establishes a wireless short-range communication with at least another of the other modules and transmits data relative to a signal strength of a signal transmission between the access device and the respective module to the other module.

According to this embodiment, a sort of network is formed between the modules of the system, wherein both a star network and a ring network or another network configuration may be established through short-range communication between the single modules. Since each of the modules detects a signal strength between the module and the access device, the data detected relative to the module can be transmitted to another module, where they can be evaluated or forwarded. For instance, it may be envisaged that only one of the modules evaluates the data or the data from all modules are forwarded through the formed network between the autonomous modules to the control device of the vehicle system. This forwarding of information occurs with a corresponding identification of the module, which has detected the respective data, so that an association of the detecting module to the signal data is possible and, based on the knowledge of the position of the identified module, the position determination of the access device may be performed.

When using the invention, after placing the modules in the interior of the vehicle it may be necessary to train the system regarding the position of the individual modules and of the signal strengths, as far as these are not placed at predetermined positions which are stored in the system. It is thus possible that the modules, by establishing a corresponding communication network between the modules, calibrate independently, in order to determine the distance between the individual modules. This calibration process between the individual modules of the system may be performed once or repeatedly, such as repeated at wider time intervals in order to achieve a new calibration.

The concept of calibration may be such that each module briefly exchanges data with each other module and that the signal strengths are detected on one or both sides. Based on the signal strengths, which represent the signal path and distance between the modules, the position of the modules to each other may then be determined by triangulation. During operation of the device, these distance information of the modules to each other may be taken into account when determining the position of the access device relative to the modules.

In a preferred embodiment of the invention, one of the modules is configured as a main module, such that it is configured for a short-range communication with all other modules, wherein the main module receives from the other modules information regarding the respective detected signal strengths, and transfers this information or an information derived therefrom to the control device.

As previously described, the network formed between the modules may fundamentally ensure that distance information is forwarded through the network. The evaluation of this information may then occur in a single module or the information is transmitted as raw data to the control device in the vehicle, where an evaluation and position determination occurs.

According to said embodiment, however, one of the modules is configured for short-range communication with all other modules, so that in this module a star connection with all other modules is present. This module receives the distance information and signal strength information from all other modules and forwards the same, processed or as raw data, to the control device.

Optionally, this main module may be powered by a particularly powerful energy source or, contrary to other modules, may be connected to a vehicle grid for power supply.

In a preferred development of said embodiment, the main module is coupled to the control device through a data cable. The data cable may be provided together with power supply cables, in order to both keep the module powered on and to forward data from the module, which have been received by the same from all other modules.

In a preferred embodiment of the invention, the mounting means of the modules are formed by adhesive pads.

Such an embodiment allows for a particularly flexible arrangement of the modules in the vehicle, in particular in the passenger compartment. The adhesive pads allow the arrangement of the modules in the region of internal panels, glasses or storages, for example.

While the invention may be fundamentally employed with different kinds of access devices, which are capable of short-range communication, it is preferred that the access device is a smartphone.

Smartphones are normally already provided with various communication devices for wireless short-range communication, such as interfaces for communication over Bluetooth or Bluetooth Low Energy.

BRIEF DESCRIPTION OF THE DRAWINGS

The invention is explained by means of the attached drawings.

DETAILED DESCRIPTION

Figure 1:
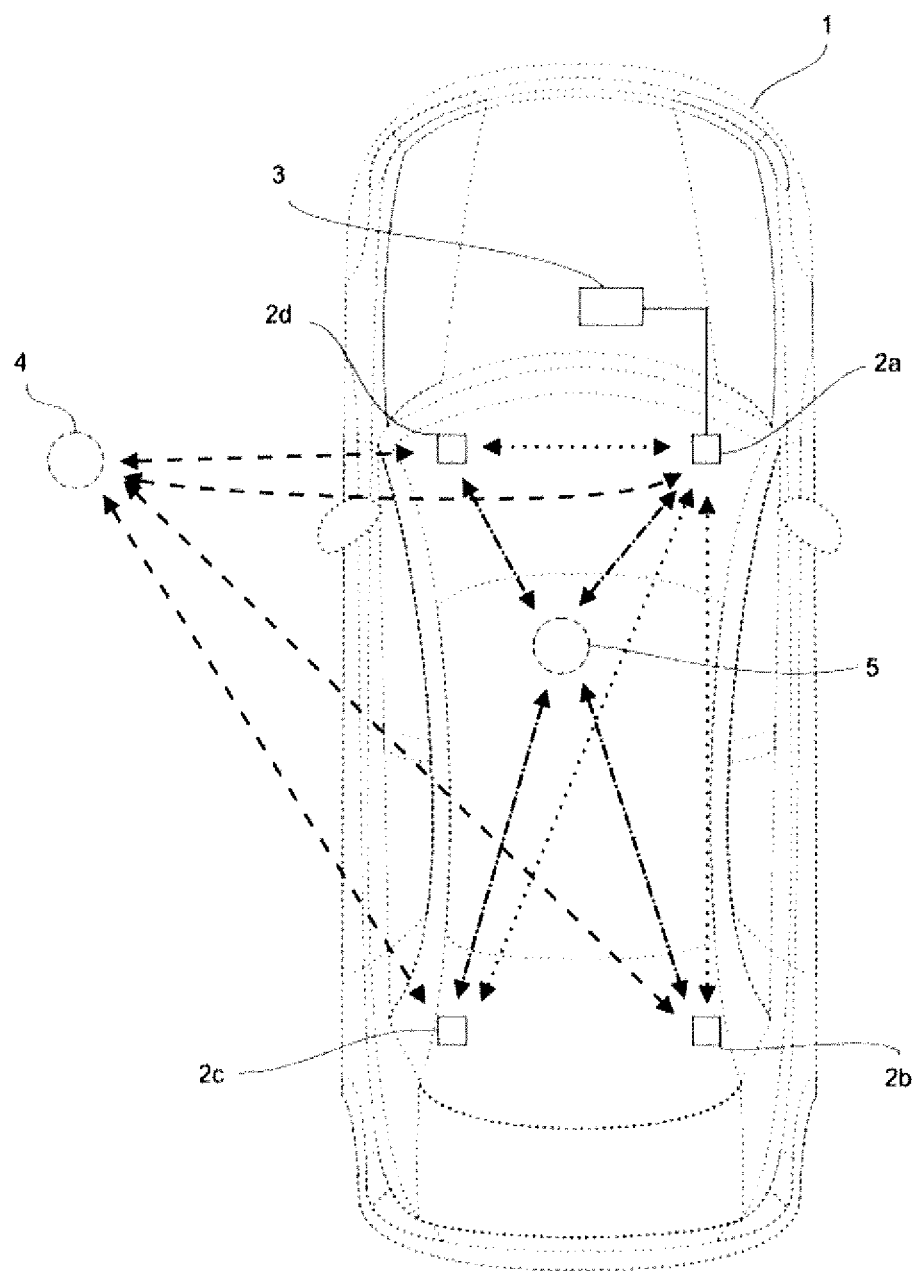
FIG. 1 schematically shows the positioning of the inventive device inside a vehicle.

FIG. 1 schematically shows a vehicle 1. In the vehicle, in different positions of the internal passenger compartment, modules 2a, 2b, 2c and 2d are positioned. The modules 2a and 2d are positioned in the region of the windshield and of the frontal dashboard and are fastened there by means of adhesive pads which are positioned on the modules. Modules 2b and 2c are internally mounted in the rear passenger compartment region, in the region of the C-beam, also by using adhesive pads.

All modules 2a, 2b, 2c and 2d are provided with communication devices according to the Bluetooth Low Energy (BLE) standard. Modules 2b, 2c and 2d are provided with energy stores formed by batteries, which are housed within the housing modules. Module 2a is coupled by means of a cable connection to a control device 3 inside the vehicle. Module 2a is also powered via the cable connection by coupling to the power supply grid of the vehicle.

Module 2a is used in this exemplary embodiment as the main module, which receives signals from the other modules 2b, 2c and 2d, which are transmitted according to the BLE standard.

Figure 2:
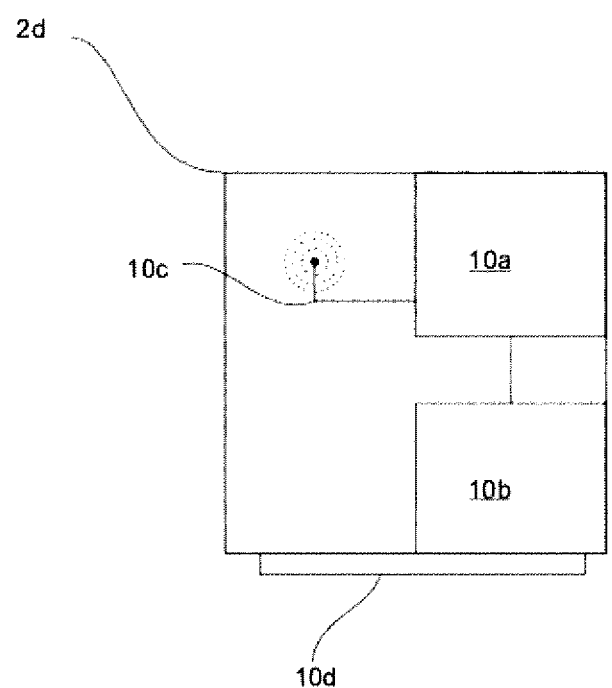
FIG. 2 schematically shows the components of a module, which are essential for the invention.

FIG. 2 shows module 2d in representation of the modules 2b, 2c, 2d. The module 2d has a communication device 10a according to the BLE standard, which is coupled to a battery 10b. An antenna 10c for transmission of the BLE signals is connected to the communication device 10a. An adhesive pad 10d having a bilateral adhesive coating is glued to the module 2d as a mounting means, and may be used for mounting the module 2d inside the passenger compartment.

A mobile access device 4 is positioned outside of the passenger compartment of vehicle 1. The mobile access device in this example is a smartphone, which is configured as a vehicle key for the vehicle. The mobile access device has a communication device for a wireless data exchange according to the BLE standard. The mobile access device 4 is coupled, to this end, to a corresponding transceiver unit on the vehicle (not shown). In order to provide a secure access to the vehicle, the position of the mobile access device 4 with respect to the vehicle is determined, in that the mobile access device 4 emits signals, whose signal strength is detected in modules 2a, 2b, 2c and 2d. To this end, the mobile access device may establish a successive data exchange with a plurality of modules 2a ... 2d.

Each of the modules, which forms a BLE connection with the mobile access device, detects the signal strength of the received signals.

The detected signal strengths of the BLE connection between the mobile access device 4 and the respective modules are transmitted to the main module 2a from the other modules 2b, 2c and 2d. The module 2a forwards the determined signal strengths to the control device 3. Therein, it is determined whether the determined signal strengths allow for a position determination and indicate a legitimate position for the requested vehicle function.

If for instance a person wearing the mobile communication device 4 would like to open the vehicle door, a position determination outside the vehicle is required. If, on the contrary, a mobile access device 5 is inside the vehicle, the signal strengths received by modules 2a, 2b, 2c and 2d from the mobile access device show considerably higher signal strengths during the BLE signal exchange.

In order to evaluate the position depending on the signal strengths, a conventional triangulation technique may be employed, or values are compared with predetermined admissible signal strength intervals with respect to associated positions. To this end, the position of modules 2a, 2b, 2c and 2d has to be determined and stored either in the main module 2a or in the control device 3. This may take place in an initial calibration process, which is started after the placement and mounting of the modules inside the vehicle. To this end, for example, the main module 2a may be arranged at a predetermined position inside the passenger compartment and a signal strength detection may occur for data exchange between the modules. Thereafter, the main module 2a receives information regarding the distance between the other modules and the main module. Moreover, the modules may exchange data among each other, such as the module 2b with module 2c and module 2c with module 2d or also 2d with 2b. These signal strengths, together with the respective identification data of modules, which determine the signal strength and of modules, which have sent the signals, may be used in the main module 2a or in the control device 3, in order to calculate a mutual position of the modules. This calibration process may happen once or may be repeated several times. Due to the flexible and autonomous energy supply of modules, a retrofitting within the vehicle is easily obtained and also the positioning within vehicles may be optimal. Correspondingly, the modular and autonomous embodiment of modules allows an improved security of position verification of mobile access devices.

The invention claimed is:

1. An apparatus for determining the position of a mobile access device relative to an associated motor vehicle,
   wherein the mobile access device has a communication device for wireless short-range communication,
   wherein the apparatus comprises:
   a control device within the associated vehicle, which is configured for disabling and enabling access to a vehicle function,
   a plurality of separate modules, which are each provided with a respective housing, a communication device for wireless short-range communication located within the respective housing,
   and an energy store located within the respective housing,
   wherein the plurality of modules are each provided with a respective mounting means, which allow an attachment of each of the plurality of modules to an interior of the associated vehicle,
   wherein at least one of the plurality of modules is coupled to the control device for data transmission,
   wherein the plurality of modules are each configured for detecting a respective signal strength of a signal transmission between the access device and the respective module,
   wherein the at least one module of the plurality of modules and the control device are configured to carry out a position determination of the access device on the basis of multiple detected signal strengths of each of the plurality of modules and to enable or disable access to the vehicle function on the basis of the determined position.

2. The apparatus of claim 1, wherein the communication devices of the plurality of modules and of the access device are configured for communication according to a Bluetooth Low Energy standard.

3. The apparatus of claim 1, wherein the plurality of modules are configured in such a way, that each of the modules establishes a wireless short-range communication with at least one other module of the plurality of modules and transmits data regarding a signal strength of a signal transmission between the access device and the respective module to the at least one other module of the plurality of modules.

4. The apparatus of claim 3, wherein the at least one module of the plurality of modules which is coupled to the control device is configured as a main module, in such a way, that it is configured for a short-range communication with all other ones of the plurality of modules, wherein the main module receives information regarding the respective signal strengths detected therein from the other ones of the plurality of modules, and transmits this information or information derived therefrom to the control device.

5. The apparatus of claim 4, wherein the main module is coupled to the control device via a data cable.

6. The apparatus of claim 1, wherein the mounting means are formed by adhesive pads.

7. The apparatus of claim 1, wherein the access device is a smartphone.

8. An apparatus for determining the position of a mobile access device relative to an associated motor vehicle,
    wherein the mobile access device includes a communication device for wireless short-range communication,
    wherein the apparatus comprises:
        a control device located within the associated motor vehicle, the control device being adapted to disable and enable access to a vehicle function,
        a plurality of modules which are spaced apart from each other, wherein each of the plurality of modules includes a housing, as well as a communication device for wireless short-range communication held in the housing and an energy store held in the housing, and a mounting means which allows an attachment of the respective module at a desired location in an interior of the associated vehicle,
        wherein at least one of the plurality of modules is coupled to the control device for data transmission,
        wherein the plurality of modules are each configured for detecting a respective signal strength of a signal transmission between the access device and the respective module, and
        wherein the at least one module of the plurality of modules and the control device are configured to carry out a position determination of the access device on the basis of multiple detected signal strengths of each of the plurality of modules and to enable or disable access to the vehicle function on the basis of the determined position.

9. The apparatus of claim 8, wherein the communication devices of the plurality of modules and of the access device are configured for communication according to a Bluetooth Low Energy standard.

10. The apparatus of claim 8, wherein the plurality of modules are configured in such a way, that each of the modules establishes a wireless short-range communication with at least one other module of the plurality of modules and transmits data regarding a signal strength of a signal transmission between the access device and the respective module to the at least one other module of the plurality of modules.

11. The apparatus of claim 10, wherein the at least one module of the plurality of modules which is coupled to the control device is configured as a main module, in such a way, that it is configured for a short-range communication with all other ones of the plurality of modules, wherein the main module receives information regarding the respective signal strengths detected therein from the other ones of the plurality of modules, and transmits this information or information derived therefrom to the control device.

12. The apparatus of claim 11, wherein the main module is coupled to the control device via a data cable.

13. The apparatus of claim 8, wherein the mounting means are formed by adhesive pads.

14. The apparatus of claim 8, wherein the access device is a smartphone.

15. An apparatus for determining the position of a mobile access device relative to an associated motor vehicle,
    wherein the mobile access device includes a communication device for wireless short-range communication,
    wherein the apparatus comprises:
        a control device located within the associated vehicle, which control device is configured for disabling and enabling access to a vehicle function,
        a plurality of separate modules which are adapted to be retrofitted in the associated vehicle, wherein the plurality of modules are each provided with a housing, a communication device for wireless short-range communication located in the housing, an energy store located in the housing, and a mounting means, which allows an attachment of each of the plurality of separate modules at a different location in an interior of the associated vehicle,
        wherein at least one of the modules of the plurality of modules is coupled to the control device for data transmission,
        wherein the plurality of modules are each configured for detecting a respective signal strength of a signal transmission between the access device and the respective module,
        wherein the at least one module of the plurality of modules and the control device are configured to carry out a position determination of the access device on the basis of multiple detected signal strengths of each of the plurality of modules and to enable or disable access to the vehicle function on the basis of the determined position.

16. The apparatus of claim 15 wherein the communication devices of the plurality of modules and of the access device are configured for communication according to a Bluetooth Low Energy standard.

17. The apparatus of claim 15, wherein the plurality of modules are configured in such a way, that each of the modules establishes a wireless short-range communication with at least one other module of the plurality of modules and transmits data regarding a signal strength of a signal transmission between the access device and the respective module to the at least one other module of the plurality of modules.

18. The apparatus of claim 17, wherein the at least one module of the plurality of modules which is coupled to the control device is configured as a main module, in such a way, that it is configured for a short-range communication with all other ones of the plurality of modules, wherein the main module receives information regarding the respective signal strengths detected therein from the other ones of the plurality of modules, and transmits this information or information derived therefrom to the control device.

19. The apparatus of claim 15, wherein the mounting means are formed by adhesive pads.

20. The apparatus of claim 15, wherein the access device is a smartphone.

* * * * *